United States Patent [19]

Ford et al.

[11] 4,132,481
[45] Jan. 2, 1979

[54] CROSS-TALK BALANCING CIRCUIT FOR SPECTROPHOTOMETERS

[75] Inventors: Michael A. Ford, Maidenhead; David Jackson, H. Wycombe, both of England

[73] Assignee: Perkin-Elmer Limited, Beaconsfield, Great Britain

[21] Appl. No.: 754,862

[22] Filed: Dec. 27, 1976

[30] Foreign Application Priority Data

Dec. 30, 1975 [GB] United Kingdom ............... 53086/75

[51] Int. Cl.$^2$ .............................................. G01J 3/42
[52] U.S. Cl. .................................... 356/325; 328/166
[58] Field of Search ........................... 356/93, 94, 95; 328/105, 166

[56] References Cited

U.S. PATENT DOCUMENTS

| | | | |
|---|---|---|---|
| 3,542,480 | 11/1970 | Ford | 356/95 |
| 3,659,942 | 5/1972 | Vergato | 356/95 |
| 3,967,900 | 7/1976 | Henninger et al. | 356/93 |
| 4,030,829 | 6/1977 | Hooper | 356/95 |

*Primary Examiner*—Vicent P. McGraw
*Attorney, Agent, or Firm*—Salvatore A. Giarratana; Francis L. Masselle; John D. Crane

[57] ABSTRACT

A cross-talk balancing circuit for double-beam spectrophotometers is disclosed. The circuit includes means to measure in four successive sample periods the sample plus sample re-radiation (S + s), reference radiation plus reference re-radiation (R + r), sample re-radiation (s) and reference re-radiation (r). The detector, however, does not respond quickly so it introduces cross-talk into each measurement. Electronic phasing circuitry selects the time when the detector output is sampled so that the cross-talk in the measurements is equalized permitting it to be subtracted out of the measurement thereby leaving a remainder which accurately corresponds to the desired quantities S and R.

16 Claims, 15 Drawing Figures

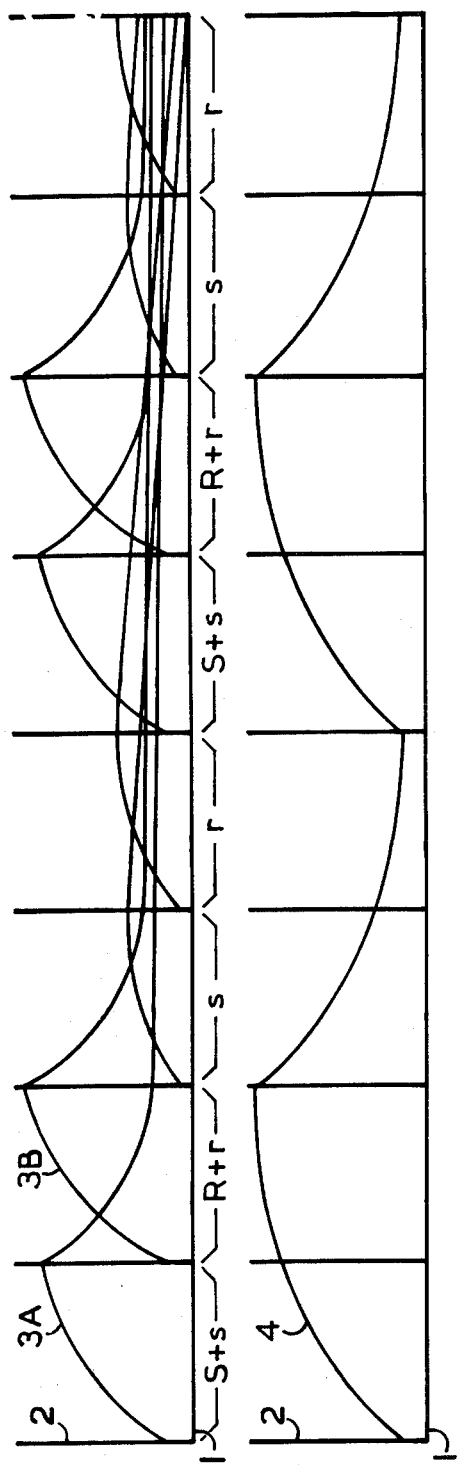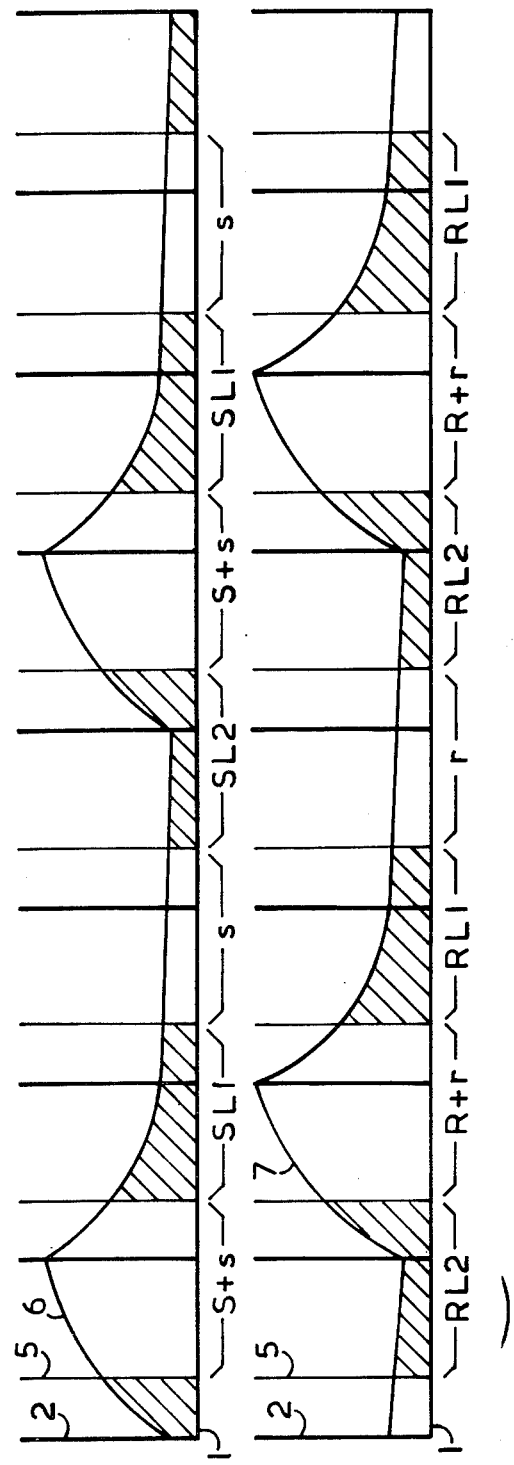
FIG. 1  FIG. 2  FIG. 3  FIG. 4

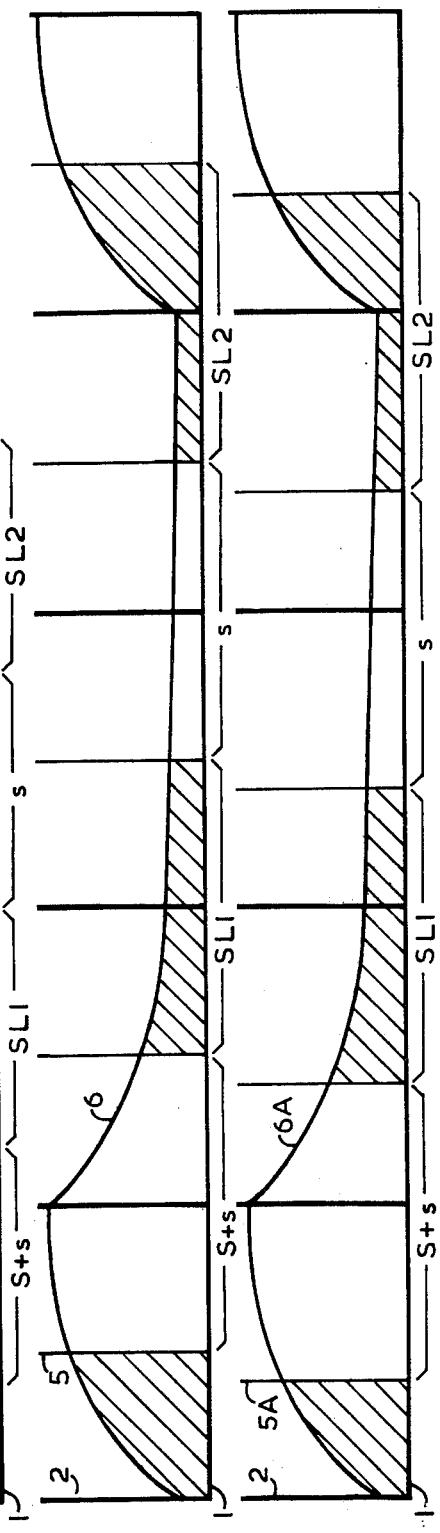

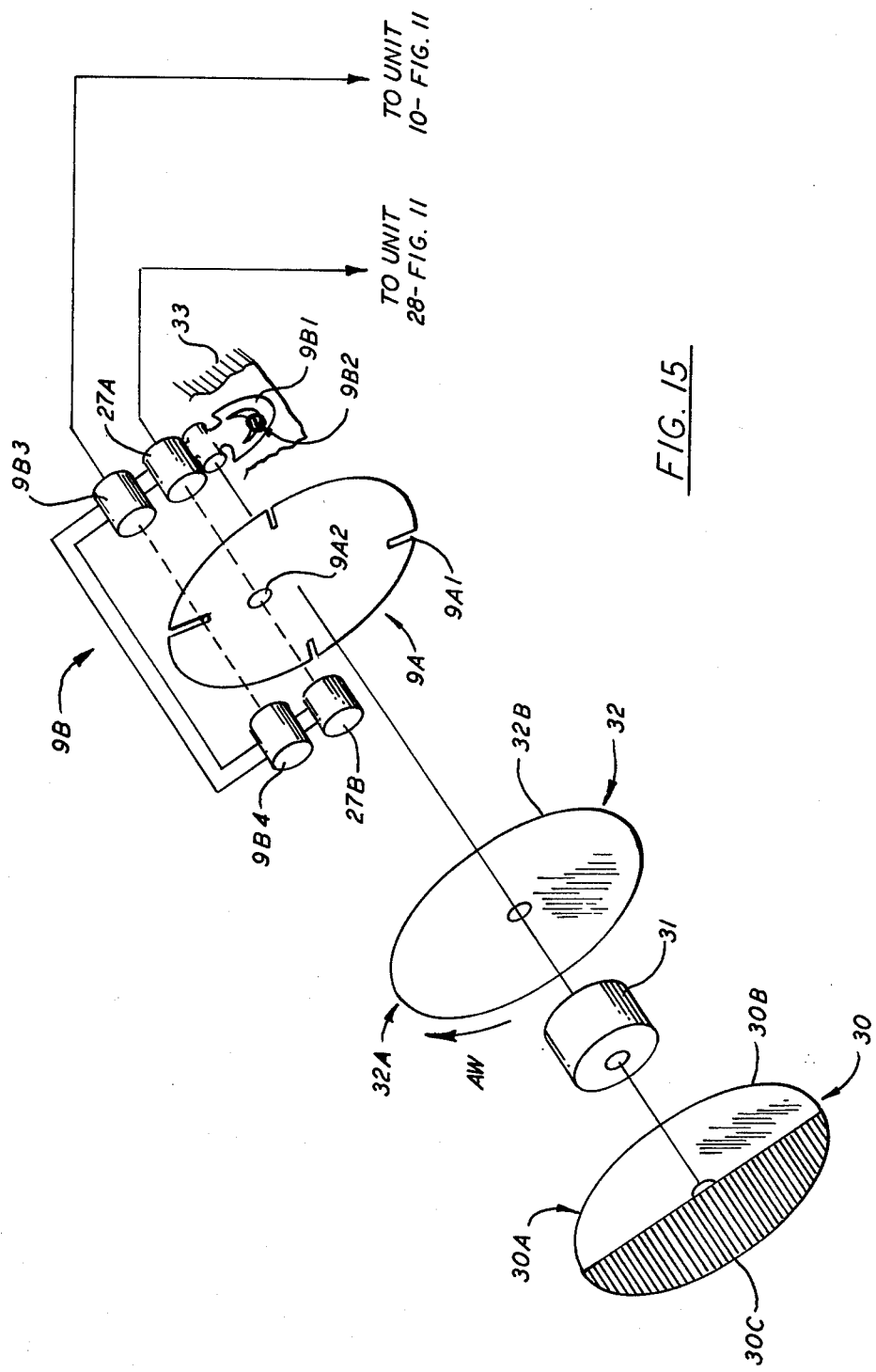

CROSS-TALK BALANCING CIRCUIT FOR SPECTROPHOTOMETERS

BACKGROUND OF THE INVENTION

The present invention relates to electrical circuit means for maintaining cross-talk balance, in an apparatus including a demodulation system phased to an AC power supply subject to spurious frequency fluctuations. One particular application of said circuit means is in a double-beam ratio-recording spectrophotometer.

In a spectrophotometer of the type referred to, the radiation emerging from a photometric source is passed through a sample under analysis sited at a sample station and reference material sited at a reference station. The radiation emerging from the sample and the reference is alternately directed into a common path by a constant speed beam recombining means, such as a sector mirror, and after passing through a monochromator is made to impinge upon a detector which provides an electrical signal output the amplitude of which corresponds to the intensity of the impinging radiation. A very simple, conventional way of driving a beam re-combining sector mirror at constant speed is to couple it to a synchronous AC motor energized from the public AC supply.

The dector output cannot, naturally, discriminate between the signal components due detector the radiation that has passed through the sample and the reference, respectively. In order to separate the two components a demodulation circuit is required. Now, the generation of the two components is strictly related in time to the speed of the sector mirror and consequently to the frequency of the AC supply. In other words, the duration of the time intervals during which the detector sees the sample and the reference, respectively, is related to the frequency of the AC supplies. The time must obviously be compressed if the frequency should rise above its nominal value, and be extended if the frequency should fall below said value.

Photometric detectors used in spectrophotometry, and in particular detectors normally used in infra-red spectrophotometers, exhibit a significant time lag between the optical signal impinging thereon and the rise of the electrical signal to its peak value. Reference to this will be made later in greater detail, but it will suffice to say here that the timing of the demodulation must take this fact into account in order to utilize the available signal output to best advantage and, in general, each demodulation point must be chosen to occur some time after the start of a radiation pulse.

The time lag referred to gives rise to cross-talk between the sample signal and the reference signal in both the demodulated sample signal and the demodulated reference signal. This crosstalk may be minimized by suitably selecting the timing of the demodulation points so as to ensure that all the signal areas due to the reference removed by demodulation from the demodulated sample signal are substantially identical and all the signal areas due to the sample similarly removed from the reference signal are identical, so that the two demodulated signals may then be ratioed together to yield an electrical value truly representative of the ratio between the optical transmission through the sample and that through the reference. When crosstalk has been minimized, it may be said that cross-talk balance has been established.

We have found that in the use of a prior art ratio-recording spectrophotometer the trace produced on the recording chart by the recording pen occasionally presented a modulation which could not be attributed to the nature of the sample. Upon investigation we discovered that it was due to spurious fluctuations in the nominal frequency value of the AC supply. We assumed that it was due to the fact that the consequent compression and expansion of the time during which the detector was exposed to an optical pulse, alternately from the sample and the reference, and the strict phasing of the demodulation points to the AC supply meant that the value attained by the detector signal at each demodulation point varied as the frequency varied, with the result that photometric accuracy was impaired in the manner revealed by the recorded trace. Again, a detailed discussion of this will be given later.

The fluctuations in the frequency of the public AC supply with which the present invention is concerned are the comparatively slow fluctuations within the range 10 to 15 percent of the nominal value. In other words, the invention deals with fluctuations the duration of which is related to the time constant of the generators at the power station. These generators have a considerable moment of inertia and this means that in normal use, when constant speed operation is aimed at, they accelerate and decelerate very slowly, as a result, for example, of changes in load. It has been found that comparatively fast frequency changes of a transient nature do occur in a public AC supply, but these are too small to cause any concern. As a general criterion, the present invention is concerned with fluctuations occuring over tens of demodulation cycles.

An example of a ratio recording double-beam spectrophotometer to which the present invention is applicable is disclosed in the U.S. Pat. No. 3,542,480, which is particularly directed to the problem of eliminating the effect of re-radiation in the sample and reference signals, respectively. In that patent, no reference is made to cross-talk balance but the demodulation system described therein would take care of it, as in other prior art arrangements, along the lines referred to above, although it would in no way be able to combat the effect of spurious frequency fluctuations on photometric accuracy, with which the present invention is specifically concerned.

Ratio-recording spectrophotometer incorporating the photometric system disclosed in the United States patent referred to will be later described as an example of one embodiment of the present invention. That photometric system is not essential to the realization of the present invention in its application to said spectrophotometer but it has been chosen for the purposes of the detailed description because it represents an advanced prior art system the advantages of which are retained when it is incorporated in a spectrophotometer in accordance with the present invention.

It is therefore a principal object of the present invention to provide circuit means to maintain cross-talk balance in an apparatus comprising a demodulation system phased to an AC power supply. It is a further object of the invention to provide circuit means to maintain cross-talk balance in the demodulation system of a ratio-recording spectrophotometer.

In achieving these and other objectives, the present invention includes a signal generating arrangement for producing at a generating frequency subject to spurious fluctuations an electrical signal having a first component varying in response to a first quantity and a second component varying in response to a second quantity. It further includes a demodulating means referenced to said signal generating means for switching each component into its own demodulation channel, and a phasing means forming part of said demodulating means for adjusting the timing of the demodulation switching referred to said generation frequency so as to separate the two components while substantially establishing cross-talk balance between the two demodulation channels. Means effective on said timing are operatively associated with the demodulating means to minimize the effect of spurious fluctuations of said frequency on said cross-talk balance.

In one specific way of carrying the invention into effect the phasing means are associated with demodulation command means for producing before the rise of a signal component a demodulation command correlated to said timing and the demodulating means include demodulation execution means for switching said signal component into its allotted demodulation channel after said rise. The means effective on said timing comprise a time delay setting means operationally related to both the demodulation command means and the demodulation execution means for delaying the operation of the demodulation execution means by a predetermined time interval from the occurrence of said demodulation command. The invention is described way of example, in its application to a ratio-recording spectrophotometer in which the outputs of the demodulating channels are ratioed and the signal representing the ratio between sample transmission (or absorption) and reference transmission (or absorption) is utilized as an input signal to a chart recorder.

DESCRIPTION OF THE DRAWINGS

The foregoing objects, advantages and features of the invention are described in greater detail in the following detailed description taken in connection with the drawings wherein:

FIG. 1 represents the idealized response of a detector in a spectrophotometer for each of the four different measurements made whereby any contribution thereto caused by other measurements is not shown;

FIG. 2 approximately represents the detector output which is a function of the amplitude of the light striking the detector at a given instant plus its response to previously made measurements.

FIG. 3 represents the demodulated sample components;

FIG. 4 represents the demodulated reference components;

FIG. 5 represents the demodulated sample signal component in a prior art spectrophotometer;

FIG. 6 represents the effect on prior art spectrophotometers when the frequency increases in the AC power supply which rotates the beam-splitting and beam-recombining device;

FIG. 7 shows the effect when the AC frequency decreases;

FIGS. 8 and 9 respectively show the effect of increase and decrease in AC power supply frequency as applied to the invention;

FIG. 15 depicts the mechanical and electrical components associated therewith for developing timing signals for controlling the circuitry of FIG. 11.

DETAILED DESCRIPTION

Figure 10:
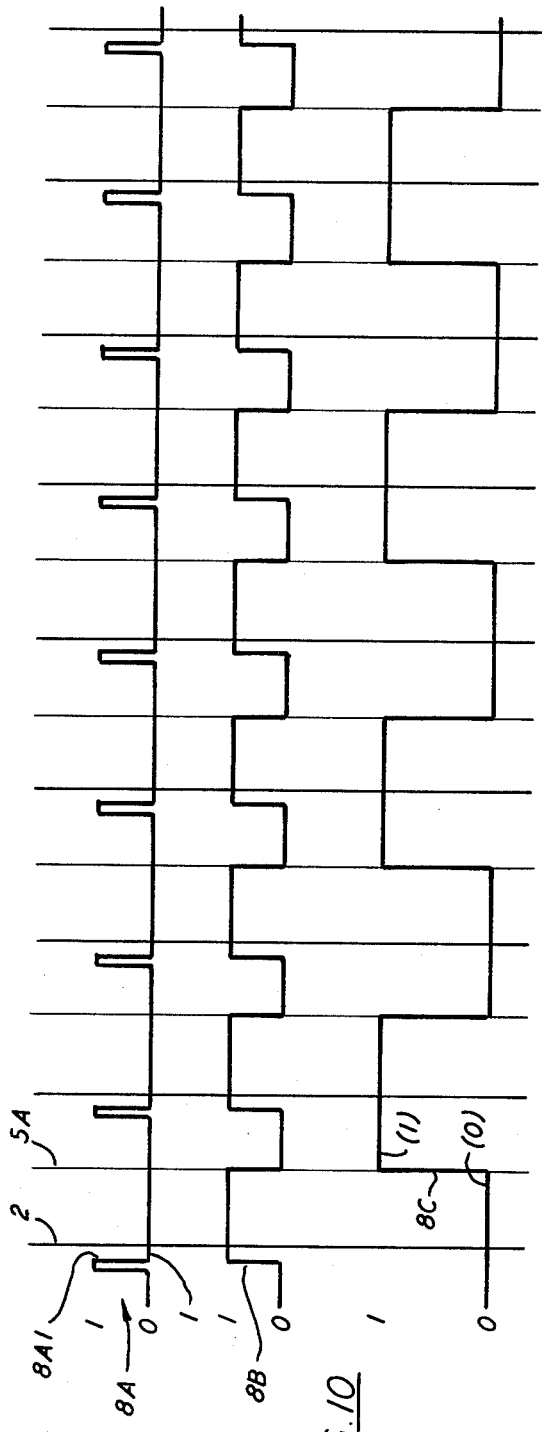
FIG. 10 depicts some of the waveforms of various signals developed in the circuitry of FIG. 11.

The following description of the invention relates to a cross-talk balancing circuit which is particularly useful in a spectrophotometer such as is described in U.S. Pat. No. 3,542,480 and assumes a familiarity with the apparatus theredescribed. Therefore, the entire content of that patent is herein incorporated by reference.

The present invention relates to apparatus comprising a signal generating arrangement for producing at a given generation frequency, subject to spurious fluctuations, an electrical signal having a first component varying in response to a first quantity and a second component varying in response to a second quantity, a demodulator phase-related to said frequency for separating said components into two distinct demodulation channels, and means for balancing any cross-talk between the said channels. The invention is concerned, in particular, with the stabilization of cross-talk balance against said spurious frequency fluctuations.

A typical apparatus falling within the above-defined apparatus area is represented by a double-beam spectrophotometer provided with a ratio-recording system. In a spectrophotometer of this type, the signal generating arrangement includes a first beam switching device for alternately routing a beam from a radiation source into a reference optical channel and a sample optical channel and a second beam switching device for alternately routing the beam from one end and other optical channel along a common path ending at a detector giving an electrical output proportional to the intercepted radiation. The detector output signal must comprise, therefore, a first signal component proportional to the intensity of the radiation emerging from the sample optical channel, said first component representing radiation transmission or absorption by the sample (i.e. said first quantity), and a second signal component proportional to the intensity of the radiation emerging from the reference optical channel, said second component representing radiation transmission or absorption by the reference (i.e. said second quantity), which in most analytical work is ambient air. The beam switching pattern must naturally be arranged to provide a zero level for the detector signal. We shall return to this later.

In such arrangement the generation frequency is naturally governed by the rate of switching for which the second beam switching device has been designed. Since both beam switching devices are usually constructed in the form of rotating sector mirrors, it is the speed of rotation of the second beam switching device that determines the generation frequency. We shall see presently that said speed may be double that of the first beam switching device.

The demodulator is often a mechanical synchronous rectifier phased to the first beam switching device for the purpose of separating the sample signal component and the reference signal component into two separate demodulation channels. Note, however, that if the two beam switching devices operate at the same speed the rectifier may be phased to either.

Cross-talk between the two channels is bound to arise if the electrical signal transfer function is non-DC. The higher the generation frequency the worse it becomes. If the detector is sluggish, the effect becomes more pronounced because after the demodulator has switched off the sample signal component said component is still decaying through the detector and the decaying portion of it appears as a spurious contribution to the next following reference signal component. We shall see later that the effect actually extends over very many cycles of the generation frequency, with the net result that the sample demodulation channel receives through the demodulator spurious reference signal contributions and the reference demodulation channels receive spurious sample signal contributions. As long as some means is employed for balancing these reciprocal contributions, it becomes possible to integrate separately the signal components switched into the two channels by the demodulator and obtain the ratio of the two integrated values for the purpose of recording on a chart a trace the ordinate of which represents the ratio between the sample and the reference signal integrals without said reciprocal contributions, or cross-talk, significantly affecting the photometric accuracy of the result.

Because a complete understanding of how cross-talk may be balanced is important for a proper appreciation of the simplicity and effectiveness of the present invention, a full explanation of what is involved will be given later with the aid of drawings. We shall then realize that cross-talk balance between sample and reference demodulation channels set up at one generation frequency does not hold if the said frequency fluctuates. In the spectrophotometer under review, fluctuations in the generation frequency would result from spurious frequency fluctuations of the AC power source, since it is common practice to drive the two beam switching devices from a single synchronous motor powered by the AC source.

In the foregoing introductory discussion we have made specific reference to a double-beam ratio-recording spectrophotometer. We shall retain such reference later in discussing the problem of cross-talk balance. Because of the subtlety involved in rendering cross-talk balance insensitive to fluctuations in the signal generation frequency, we believe that it will be easier to appreciate the present invention in the context of a well-known art than in that of a generalized discussion. Furthermore, spectrophotometry represents a typical field of application and thus allows the sort of situation in which the present invention may be applied to be fully appreciated by analogy.

According to the present invention there is provided apparatus, comprising: (a) a signal generating arrangement for producing at a given generation frequency subject to spurious fluctuations an electrical signal having a first component varying in response to a first quantity and a second component varying in response to a second quantity; (b) demodulating means for switching each component into its own separate demodulation channel; (c) said demodulating means including phasing means for adjusting the timing of the demodulation switching relative to said frequency so as to separate the two components while substantially establishing cross-talk balance between the two channels, and (d) means effective in operation on said timing to minimize the effect of fluctuations in said frequency on said cross-talk balance.

Preferably, the phasing means are arranged to command each demodulation switching of a signal component into its alloted demodulation channel before the rise of said signal component begins and the means effective on said timing are made to introduce a fixed time delay between the time each demodulation switching is commanded and the time it is executed so as to allow the signal component to rise to a significant value before it is switched into its demodulation channel.

The fixed time delay may be set by a means of a first monostable switch having a switch over time equal to said time delay, said first monostable switch being actuated by a pulse produced by the phasing means at the instant a demodulation switching is commanded. The first monostable switch thus sets the time of each demodulation switching execution and may be made to control a bistable switch arranged to change state at the time of each execution, so that one state extends over the time interval during which one of the two signal components is available for demodulation and the other state over the time interval the other component is available for demodulation. Finally, each state of the bistable switch may be made to control a selector switch so as to pass one of the two signal components through into its alloted demodulation channel, thus completing the demodulation process initiated by the phasing means.

The invention apparatus may form part of a double-beam ratio-recording spectrophotometer, in which case the signal generating arrangement may comprise rotary beam switching means for first routing a radiation beam from a radiation source alternately into an optical sample channel and an optical reference channel and then re-directing the radiation alternately from one and other channel along a common path and, in addition, a detector mounted to intercept the radiation directed in said common path and capable of producing an electrical output proportional to the intensity of the intercepted radiation. The spectrophotometer would include means for obtaining the ratio between the output of the sample demodulation channel and that of the reference demodulation channel.

Bearing in mind the justification referred to earlier, we shall now consider in the specific context of a double-beam ratio-recording spectrophotometer, the nature of cross-talk and its treatment in prior art instrumentation, as a prelude to offering a possible explanation of the disturbing effect on cross-talk balance of a fluctuating signal generation frequency and thus leading to a proper appreciation of the present invention.

Although in a spectrophotometer electrical signal cross talk between sample and reference demodulation channels arises from a number of causes, in most infrared spectrophotometers in which a thermal detector is used, the detector represents in practice the major cause. We will, therefore, assume for the purposes of this discussion that the spectrophotometer is indeed an infrared spectrophotometer embodying a thermocouple detector. It may be said in passing that in the present state of the spectrophotometric art thermal detectors are still the designer's natural choice.

It is of course well known that in a ratio-recording instrument in which the demodulated sample signal integral and the demodulated reference signal integral are to be ratioed together it is essential to arrange the switching pattern of the beam switching means in such manner that a separation is introduced in the detector output after, say, a reference signal component has immediately followed a sample signal component, the separation being intended to enable an electrical baseline to be established in a practical system. We prefer to refer to the beam switching mode as disclosed in U.S. Pat. No. 3,542,480, which introduces the additional refinement of substantially eliminating the adverse effect which re-radiation from both the sample optical channel and the reference optical channel would otherwise have on photometric accuracy.

In accordance with the beam switching pattern disclosed in said patent, in which the cross-talk problem was not considered, first the sample radiation plus sample re-radiation (S + s) is passed to the detector, next the reference radiation plus reference re-radiation (R + r) is passed, followed by sample re-radiation (s), and finally reference re-radiation (r). The four stages should each be taken to correspond to a 90° rotation of a first beam switching device in the form of a constant speed beam-dividing sector mirror having, in succession, a straight-through-air-quadrant, a reflective quadrant and two opaque and non-reflecting quadrants. The beam-dividing sector mirror co-operates with a second beam switching device in the form of a beam-recombining sector mirror rotating twice as fast and comprising two opaque non-reflective quadrants followed by two straight-through-air quadrants. The said switching pattern is the result of suitably phasing the two sector mirrors.

For the purposes of the present discussion, it is preferable to consider the four stages as four equal time intervals. Henceforth we shall, therefore, use the phrase "optical quadrant" to denote the time interval during which a beam is passed through to the detector. Furthermore, the phrase "optical pulse" will denote radiation (in its generic sense it includes re-radiation, of course) passed during an "optical quadrant", the optical pulse having a "leading optical edge" and a "trailing optical edge" sited at the beginning and end, respectively, of an optical quadrant. To simplify matters, the trailing edge arising in one optical quadrant is assumed to be coincident with the leading edge arising in the next optical quadrant.

Demodulation switching will also be considered on a time basis, the phrase "demodulation points", applicable to the prior art exclusively, denoting demodulation time limits and the phrases "demodulation command points" and "demodulation execution points", applicable to our invention exclusively, setting the demodulation command and demodulation execution limits, respectively.

FIG. 1 of the attached diagrammatic drawings is an attempt to analyse, in a somewhat idealized manner, the composition of the detector output signal. A time axis is indicated at 1 and this is divided in 8 identical optical quadrants (corresponding to two complete revolutions of the re-dividing sector mirror referred to earlier and consequently two complete demodulation cycles) by equally spaced vertical lines such as 2, representing overlapping leading and trailing optical edges, the identity of the quadrants in terms of the detector signals arising therein being as shown and time "flowing" from left to right, e.g. No. 8 optical quadrant is the last occurring in time.

Taking the first quadrant on the left, the S + s signal component is denoted by the curve 3A rising exponentially up to the trailing edge of the first optical quadrant and decaying exponentially throughout the remaining quadrants. Similarly, for the R + r signal component (line 3B) arising in the second optical qudrant, and so on. The complexity of the detector output make up after many revolutions of the sector mirror may be judged by the number of signal contributions shown in No. 8 optical quadrant, wherein only the exponentially rising curve denotes the signal genuinely originating in said quadrant, the remainder being "leakage" from the preceding 7 optical quadrants. The term "leakage" is used in the present context to consider separately each of the two reciprocal signal contributions inherent in the term "cross-talk".

The leakage arises mainly from the fact that the signal through the detector does not fall to zero as a trailing optical edge is passed because a thermal detector naturally requires time to heat up and cool down. The detector tends to integrate the individual signal contributions by producing an electrical output approximately conforming to the curve 4 in FIG. 2. It is strikingly clear from this curve that the signal arising in the sample re-radiation optical quadrant (s) receives contributions from the other optical quadrants that together could well exceed what the genuine sample re-radiation signal would otherwise be.

We are now able to sense that if we were to make the demodulation points coincident with the edges of the optical pulses photometric accuracy would be severely impaired. The confirmation that this is so will follow from consideration of FIGS. 3 and 4, representing the demodulated sample and reference signal components, respectively, with the demodulation points spaced from the leading optical edges of the associated optical quadrants.

In both FIG. 3 and FIG. 4 the thin lines such as 5 represent demodulation points delayed with respect to leading optical edges. The cross-hatched areas under curve 6 in FIG. 3 represent the portions of the sample signal component removed by demodulation and the cross-hatched areas under the curve 7 in FIG. 4 similarly represent the portions removed from the reference signal component. The clear areas under each curve constitute portions of signal component actually switched into the associated demodulation channel. Now, a cross-hatched area appearing between two successive demodulation points under one curve represents leakage into the clear area appearing between the same two demodulation points under the other curve.

In FIG. 3, we have referenced SL1 (Sample Leakage 1) and SL2 (Sample Leakage 2) the two areas representing leakage into the clear areas (R + r) and (r), respectively, which appear immediately below in FIG. 4. Similarly, in FIG. 4 RL1 and RL2 denote leakage into the (s) and (S + s) areas, respectively, of FIG. 3. If the demodulation points are so chosen that areas SL1 and SL2 become identical and areas RL1 and RL2 also become identical, then we may denote either of the first two areas as SL and either of the second two areas as RL and the following must be true:

$$(S + s + RL) - (s + RL) = S$$

$$(R + r + SL) - (r + SL) = R$$

which clearly means that cross-talk is in balance in each demodulation channel, and therefore, substantially eliminated therefrom.

In general terms, cross-talk balance is established, within the context of the present application, when the signal areas of the detector output excluded by demodulation from the demodulated sample signal are substantially identical with one another and, similarly, the signal areas excluded from the demodulated reference signal are substantially identical with one another.

Inspection of FIG. 3 shows that if the demodulation points are shifted to the left (i.e., they are advanced in time) the SL1 area will gain in the higher-signal region on the left and lose in the lower-signal region on the right and, conversely, SL2 will gain in the lower-signal region on the left and lose in the higher-signal region on the right, with the result that SL1 becomes larger than SL2. The inverse applies if the demodulation point is shifted more to the right (i.e. it is delayed). The same reasoning applies to FIG. 4.

In hitherto known spectrophotometers, mechanical phasing means are frequently found for setting the demodulation points in the correct relationship to the leading edges of the sectors provided in the sector mirror. The demodulating means may essentially comprise a demodulating commutator and a co-operating set of pick up brushes, the commutator being integral in rotation with the sector mirror. The brushes may form part of an assembly that can be released for rotation around the same axis as the rotational axis of the sector mirror. Phasing may then be carried out by simply rotating the assembly by the appropriate angle before looking it in position. The demodulation points shown in FIGS. 3 and 4 are assumed to have been set through some form of mechanical phasing arrangement.

We can now proceed with the explanation of what happens to cross-talk balance if the generation frequency of the detector fluctuates. To facilitate understanding, we have drawn 5 curves in FIGS. 5 to 9, respectively. The curve of FIG. 5 represents the demodulated sample signal component as in a prior art spectrophotometer and is therefore not dissimilar from the curve of FIG. 3, except that we have chosen demodulation points, again represented by the vertical lines 5, occurring in the middle of the optical quadrants. This amount of demodulation delay is not at all unrealistic and we have chosen it simply to make our explanation a little easier to follow, but it must be understood that in practice the demodulation points might be sited in a different relation to the leading optical edges preceding them. Having located FIG. 5 in the middle of the set of five curves, we have illustrated in FIG. 6 immediately above it what happens when the generation frequency increases and in FIG. 7 immediately below it what happens when the generation frequency decreases. Then FIG. 8 above FIG. 6 and FIG. 9 under FIG. 7 are made to show the result of applying our invention. This layout will be found convenient in comparing the prior art performance with that of our invention for excercusions of the generation frequency above and below its normal value.

If we start by comparing the curve of FIG. 5 with that of FIG. 6, we note that as a result of the increase in generation frequency the optical quadrants have been compressed, as one would points since the time taken by each quarter revolution of the sector mirror has become shorter and consequently the optical pulses have also become shorter. If the demodulation point was sited in the middle of an optical quadrant in FIG. 5 (which it was, of course) it must remain in the middle of a compressed quadrant in FIG. 6. The compression of the optical quadrants means that the trailing optical edges now occur earlier and that the sample signal component peaks at a lower value but the general shape of the curve is retained. On the other hand, the demodulation points, have effectively been advanced and we have seen already that this must cause SL1 to become greater than SL2.

Exactly the opposite is found to happen when comparing the curve of FIG. 5 with that of FIG. 7: the optical quadrants are expanded, the demodulation points retarded and SL1 becomes smaller than SL2.

It is thus seen that cross-talk balance as set up in prior art instruments is bound to be upset when the generation frequency fluctuates.

Finally, we are able to consider the situation that arises when our invention is applied. The demodulation points referenced 5 in FIGS. 5, 6 and 7, become demodulation execution points 5A in FIGS. 8 and 9. Comparing first FIG. 8 with FIG. 5, we observe that the demodulation execution points 5A and the demodulation points 5 occur at the end of the same time interval from the leading optical edges respectively associated therewith. The reason for this is simply that in FIG. 8 the demodulation execution points occur with a fixed time delay from the demodulation command points which, as we shall see presently, are made to occur before the leading optical edges. The time interval between a leading optical edge and a demodulation execution point that follows it clearly cannot change because this interval is included within the total time delay between the demodulation command points and the demodulation execution points. On the other hand, the optical quadrants have become compressed as in the curve of FIG. 6. The net result must be therefore, that the demodulation start has effectively been delayed and this is exactly what is required to counteract the cross-talk unbalance effect described with reference to FIG. 6.

In FIG. 9 the demodulation execution points again coincide with the demodulation points of FIG. 5 but the optical quadrants have expanded and this means that the demodulation start has effectively been advanced, which again is what is required to counteract the cross-talk unbalance effect described with reference to FIG. 7.

The time relationship between the demodulation command points and the demodulation execution points is shown in FIG. 10, wherein the thick vertical lines 2 represent the limits of the optical quadrants as in earlier figures and the thin vertical lines 5A represent the demodulation execution points. The demodulation command points are indicated at 8A1 and are seen to occur some time before the leading optical edges.

Figure 11:
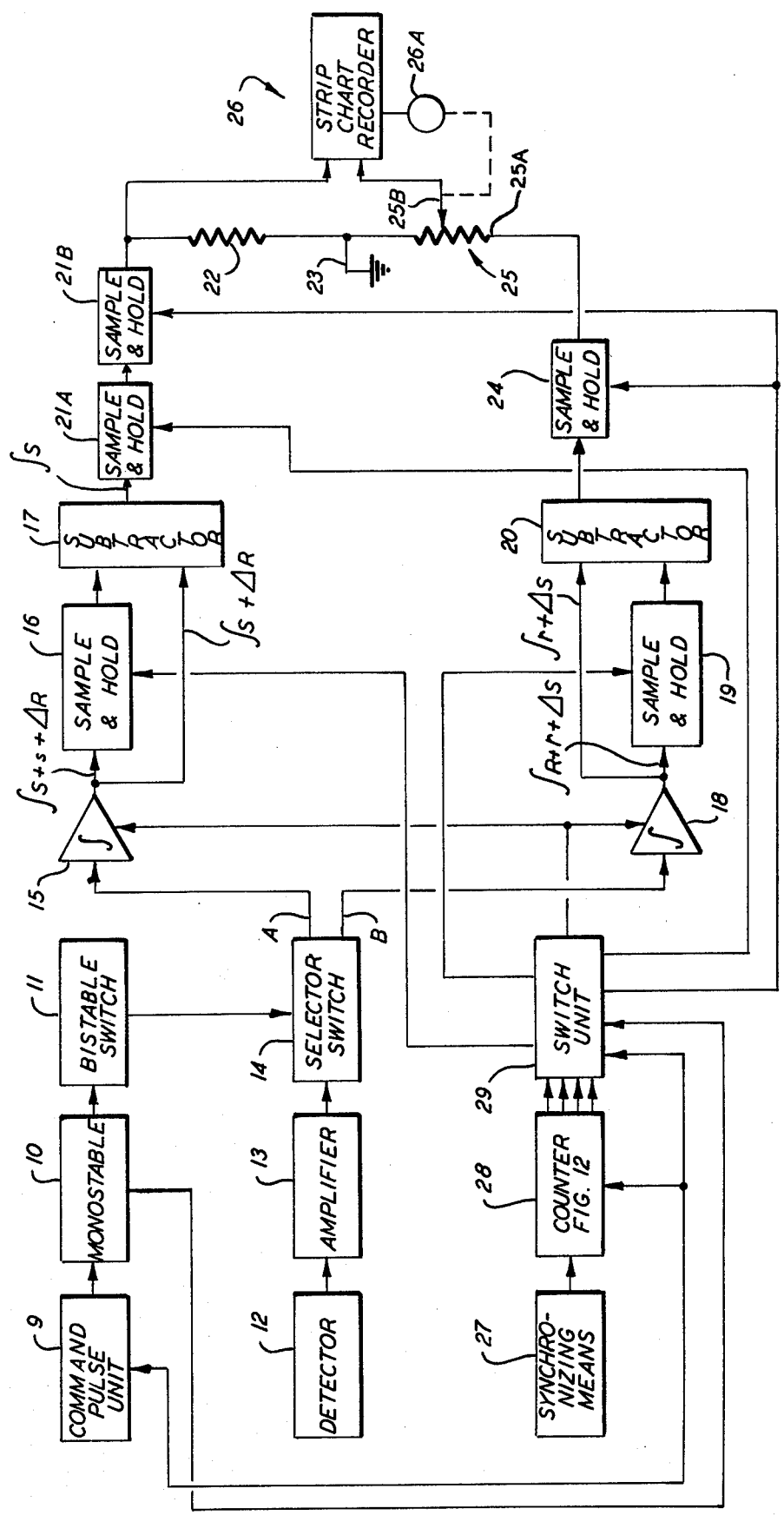
FIG. 11 represents electronic circuitry of the present invention.

FIG. 11 represents an embodiment of the present invention and is best considered together with FIG. 10 so as to clearly associate the waveforms shown in FIG. 10 with the means responsible for them in FIG. FIG. 11. In FIG. 11, a demodulation phasing and command unit 9, which will be described in greater detail with reference to FIG. 15, provides properly phased demodulation command pulses as represented as 8A in FIG. 10, which are seen to occur some time before the leading optical edges. The command pulses from unit 9 control a monostable switch 10 having an in in-built switch over time of several milliseconds (the actual delay required by the system for satisfactory compensation against mains frequency variations in accordance with the present invention depends on so many variables that the best way of optimizing compensation is to try different delays). The trailing edges of the pulses produced by monostable switch 10 (see waveform 8B in FIG. 10) actually mark the demodulation execution points. Monostable 10 in turn controls a bistable switch 11, which as shown by the waveform 8C in FIG. 10, remains in one state in the time interval between two successive demodulation execution points and in the other state between the next two points and so on.

At this stage it is useful to introduce the concept of demodulation quadrant as the interval during which the bistable 11 is in one of the two states. To be more specific, we shall assume that the binary state identified as (1) in waveform 8C of FIG. 10 is associated with the first and third demodulation quadrants, i.e. those giving $(S + s + RL)$ and $(s + RL)$, respectively, and the (0) state with the second and fourth demodulation quadrants, i.e. those giving $(R + r + SL)$ and $(r + SL)$, respectively.

A spectrophotometric detector is shown at 12 feeding into an amplifier 13 the output of which is routed through the selector 14 controlled by the bistable 11. Selector 14 provides two outputs, the one marked A conveying the sample information, i.e. the information provided by the first and third demodulation quadrants, and the one marked B conveying the reference information, i.e. the information provided by the second and fourth demodulation quadrants.

Considering output A first, this leads to a sample signal integrator 15, which by a direct route as well as a route passing through a sample and hold device 16 feeds into subtracting unit 17. Similarly for output B associated with reference signal integrator 18, sample and hold device 19 and subtracting unit 20. The output of unit 17 is taken first to a sample and hold device 21A leading through a back-up sample and hold device 21B to resistor 22 connected to ground 23. The output of unit 20 is taken to a sample and hold device 24 leading to one end of the potentiometer wire 25A of potentiometer 25, the other end being connected to ground 23. The slider 25B of potentiometer 25 provides one input to chart recorder 26 and is positioned by the pen servo motor 26A of said recorder. The other input to the recorder 26 is provided by the output of the sample and hold device 21B.

A demodulation cycle synchronization means 27, a counter 28 and a logic switching unit 29 co-operate to control the five sample and hold units and the resetting of integrators 15 and 18, with a timing dictated by the pulses produced by the demodulation phasing and command unit 9, which in the context may thus be regarded as clock pulses.

We shall first examine how the sample and reference signal information is freed from the signal contributions due to re-radiation effects before the integral of the "clean" sample signal is ratioed with the integral of the "clean" reference signal.

The overall control arrangement (which we shall later describe in detail) is such that each of integrators 15 and 18 is reset during that pulse of the monostable switch 10 the trailing end of which sets the start of the demodulation quadrant in which the integrator considered is active. This means that integrator 15 is reset during the pulse produced by monostable 10 immediately preceding the start of the first and third demodulation quadrants and integrator 18 is reset during the pulse from the same unit immediately preceding the start of the second and fourth demodulation quadrants.

The demodulation command pulse for the first demodulation quadrant produced by the demodulation phasing and command unit 9 is always preceded, as we know, by a cycle synchronization pulse from means 27. Assuming that this pulse sequence has taken place, integrator 15 will be reset during the constant time delay produced by unit 10 and from the end of such delay, i.e., from the start of the first demodulation quadrant, will integrate $(S + s + RL)$ for the duration of said quadrant. Similarly, integrator 18, reset during the time delay preceding the second demodulation quadrant, will from the end of said delay and for the duration of said quadrant integrate $(R + r + SL)$.

Upon the demodulation command for the third demodulation quadrant issuing from unit 9, the sample and hold unit 16 is caused to sample the content of integrator 15 before being reset during the ensuing pulse produced by monostable 10. Similarly, upon the demodulation command for the fourth demodulation quadrant issuing from unit 9, the sample and hold unit 19 is caused to sample the content of integrator 18 before being reset during the ensuing pulse produced by monostable 10.

During the third demodulation quadrant, integrator 15 integrates $(s + RL)$ and the subtracting unit 17 instantaneously yields and sustains at its output a signal representing $(S + s + RL) - (s + RL) = S$. During the fourth demodulation quadrant, integrator 18 integrates $(r + SL)$ and the subtracting unit 20 instantaneously yields $(R + r + SL) - (r + SL) + R$.

At the command point for the second demodulation cycle and for the duration of the command pulse for the first demodulation quadrant in said cycle, the sample and hold unit 21A duplicates the content of subtracting unit 17. At the command pulse for the second demodulation quadrant, in said second demodulation cycle, samle and hold unit 21B and sample and hold unit 24 simultaneously duplicate the contents of units 21A and 20, respectively. The integrals of the sample and reference signals thus become available at the same time across the resistor 22 and the potentiometer wire 25A, respectively. The input of recorder 26 "sees" the whole of the integral of the sample signal and a tapped off portion of the integral of the reference signal. The pen servo 26A responds to the signal difference appearing at the input of recorder 26 by altering the position of the slider 25B until the difference has been reduced to zero. The position of the slider 25B, which naturally corresponds to the position of the recording pen across the recorder chart, represents the ratio between the integral of the sample signal and the integral of the reference signal.

We now need to consider the means for implementing the control logic governing the operation of the integrators and the sample and hold devices. Let us first examine in detail, with reference to FIG. 12, the counter 28 of FIG. 11. This counter is intended to provide a series of sequential pulses on each of lines 28A, 28B, 28C and 28D, a pulse on line 28A terminating coincidentally with the rise of a pulse on line 28B and so on. A first pulse on lines 28A shall span the leading edge of the demodulation command pulse for the first demodulation quadrant and the leading edge of the second command pulse. A second pulse on line 28B shall span the leading edge of the second command pulse and the leading edge of the third command pulse and so on, until a pulse again appears on line 28A and the cycle repeats.

Figure 13:
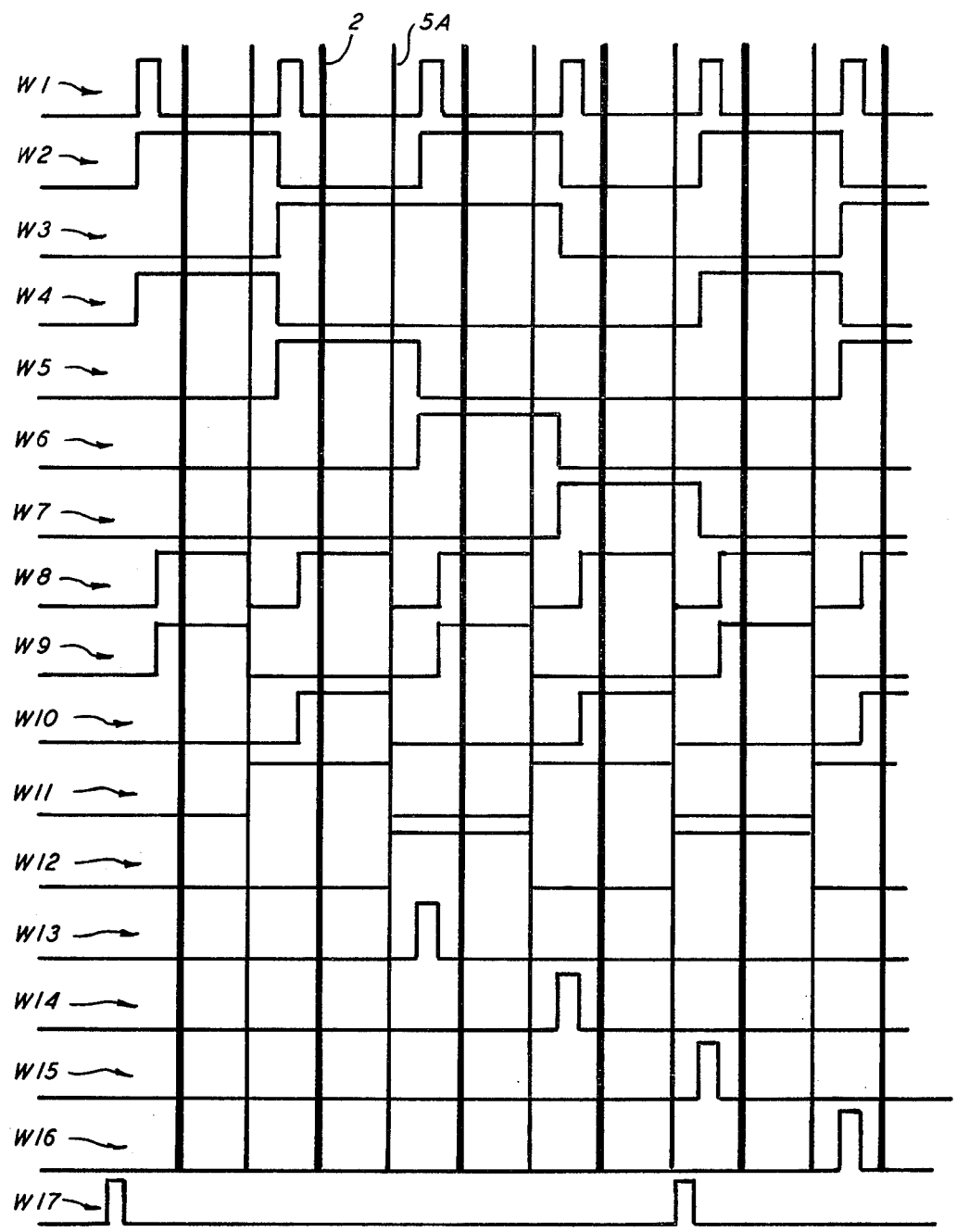
FIG. 13 represents pulse diagrams developed at various points in the circuit of FIG. 11.

FIG. 13 shows the waveforms of the various control pulses set against the thick vertical lines 2, and the thin vertical lines 5A, which as in earlier waveform representations relating to the invention define the limits of the optical quadrant and those of the demodulation quadrants respectively. The waveforms already shown in FIG. 10 have been repeated (with the exception of 8C) to enable an easier appreciation of their time relationship to the remainder of the control pulses. The demodulation command pulses shown at 8A in FIG. 10 are referenced W1 in FIG. 13 and shown at the top. As we have said earlier, they may be regarded as clock pulses in the context of the control logic since they set the timing of the control functions. Waveform 8B becomes W8.

The waveforms associated with lines 28A to 28D, respectively, are shown at W4 to W7, inclusive. To understand how the four pulse series are obtained, we need to consider FIG. 12 in conjunction with FIG. 13.

Figure 12:
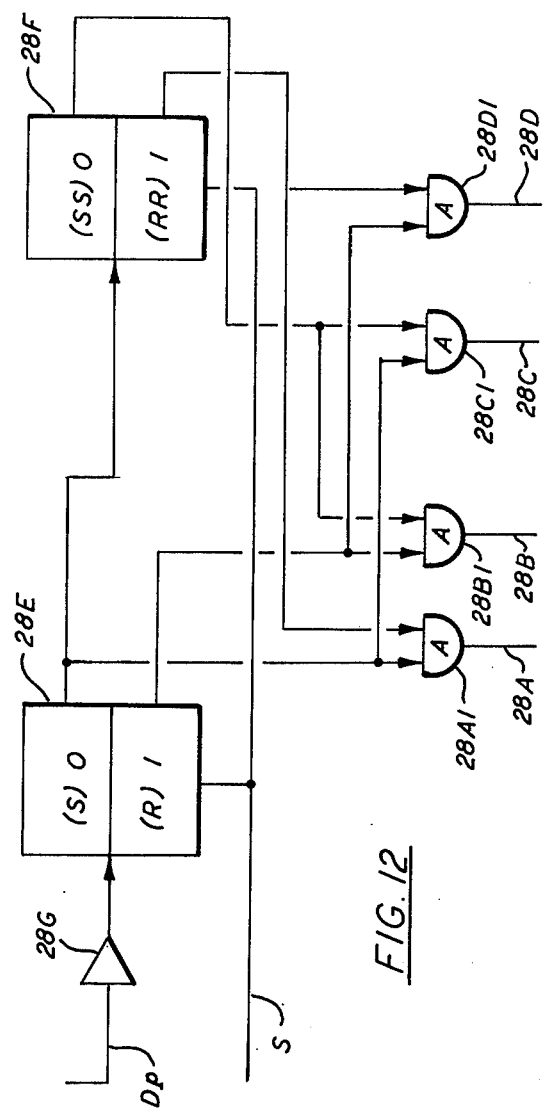
FIG. 12 is the counter 28 of FIG. 11.

In FIG. 12 we have essentially two bistable switches referenced 28E and 28F, respectively, which are impulsed by the demodulation command pulses (W1 in FIG. 13) starting from a cycle synchronization pulse provided by the demodulation cycle synchronization means 27 (FIG. 11) which ensures that 28A is invariably associated with the first demodulation quadrant, 28B with the second and so on.

Bistable 28E comprises a lower Reset stage marked (R) 1 (R stands for Reset stage and 1 denotes the binary state of the stage when reset) and an upper Set stage (S)0 (S stands for Set and 0 denotes the binary state of the stage when inactive). Similarly, 28F comprises lower Reset state (RR)1 and upper Set state (SS)0, the double letters being used to distinguish stages as between monostables. Lines 28A to 28D are served by AND gates 28A1, 28B1, and 28C1 and 28D1, respectively.

A convenient start point for explaining the operation of the layout shown in FIG. 12 is the instant when a cycle synchronization pulse is produced by means 27 of FIG. 11 just ahead of the demodulation command pulse for the first demodulation quadrant (W17 represents the synchronization waveform). Upon the cycle synchronization pulse becoming available on line S (which corresponds to the route linking unit 27 to unit 28 in FIG. 11) 28D and 28F are both reset. The first demodulation command pulse available on route DP from control unit 9 and inverted by inverter 28G so that its leading edge is negative going instead of positive going, causes bistable 28E to flip over, i.e. (S) 0 changes to (S) 1, and (R)1 changes to (R)0, and dwell in the new condition until the next negative going edge occurs, when (S) 1 reverts to (S)0 and (R) 0 to (R)1. This is because bistable 28E is in fact designed to change state only when it receives a negative going pulse edge. It will, therefore, ignore the trailing negative-going edge of the first inverted demodulation command pulse but respond to the inverted leading edge of the second demodulation command pulse. In other words, the Set stage of bistable 28E will provide an output representing in effect a division by 2 of the demodulation command pulses, as shown at W2 in FIG. 13. The output of the Set stage of 28E is extended to the bistable 28F which is also made to respond to negative-going pulse edges. Bistable 28F will flip over at the end of the first pulse shown at W2 but will ignore the next occurring edge of the W2 pulse (since it is positive going (and respond to the one after that as shown at W3. The output of the Set stage of bistable 28F thus provides a division by four of the demodulation command pulses.

Inspection of FIG. 12 suggests that the stages that need to be at state 1 for the activation of each gate in turn may be identified as in the following table:

|  | Gate 28A1 | Gate 28B1 | Gate 28C1 | Gate 28D1 |
|---|---|---|---|---|
| Bistable 28E | Set | Reset | Set | Reset |
| Bistable 28F | Reset | Set | Set | Reset |

From waveforms W2 and W3 in FIG. 13 we can immediately tell whether Set stages of the two monostables are at 1 or not, and by simply relating the two waveforms to the above table we may easily predict the waveforms W4 to W7 (FIG. 13) that will appear at the output of the four gates, respectively.

Figure 14:
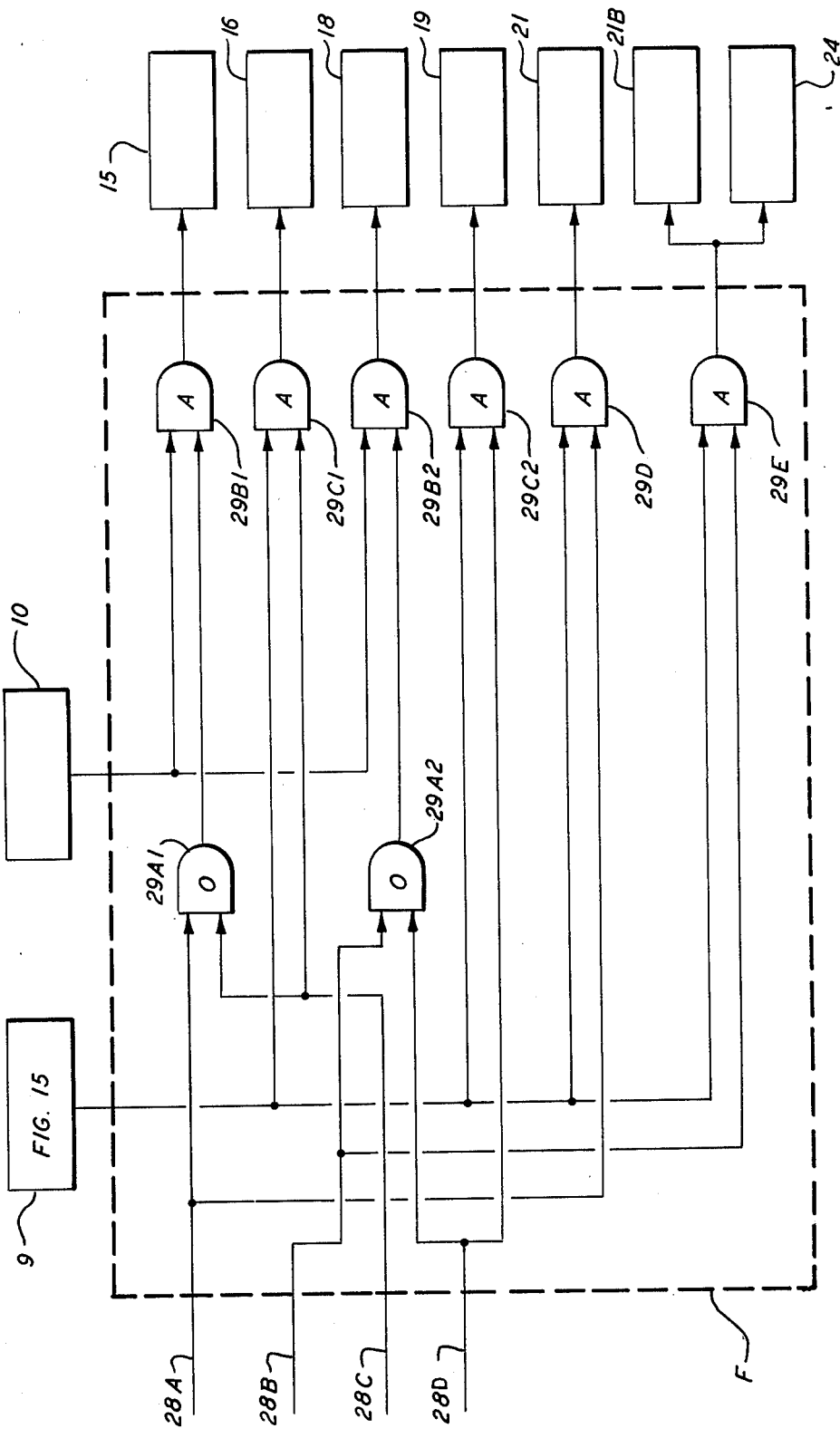
FIG. 14 represents the switching unit 29 of FIG. 11.

The utilization of the waveforms W4 to W7 for control purposes will now be described with reference to FIG. 14, wherein the circuitry within the chain dotted frame F represents the logic switching unit 29 in FIG. 11 and the units outside the frame are identified with those bearing like references in FIG. 11. In so far as resetting the integrators is concerned, we already know that the pulses from monostable 10 are used for this purpose. The waveform provided by unit 10 is shown at W8 in FIG. 13.

To explain the operation of the FIG. 14 layout, we shall again start with a first cycle synchronization pulse immediately followed by a first demodulation quadrant command pulse. This, as we now know, makes the first pulse in waveform W4 available on line 28A. Through the OR gate 29A1, the said pulse provides a state 1 input to the AND gate 29B1 controlling the resetting of integrator 15. Another input to AND gate 29B1 is provided by the unit 10. Relating waveforms W4 and W8, we observe that the two inputs are coincident for the duration of every other pulse from unit 10 and that, therefore, the reset waveform of integrator 15 is as shown at W9, suggesting that integrator 15 is reset before the first and the third demodulation quadrants, which we know to be correct from our previous discussion.

At the end of the gating pulse from unit 10 the AND gate 29B1 is de-activated and the integrator 15 fills up with the information from the first demodulation quadrant (S + s + RL). In waveform W11 the pulses shown represent the demodulation quadrants during which the sample information is integrated.

When the second demodulation command pulse occurs, the first pulse of waveform W5 is generated and, as we know, this is made available on line 28B. The operation in resetting integrator 18 is as described with reference to the resetting of integrator 15, OR gate 29A2 and AND gate 29B2 this time co-operating with unit 10. The reset waveform for integrator 18 is shown at W10. Waveform W12 represents the demodulation quadrants during which the reference information is integrated.

Upon the demodulation command pulse for the third demodulation quadrant rising, the first pulse in waveform W6 rises too and becomes available on line 28C, which forms an input to AND gate 29C1 controlling the sample and hold device 16, the other input being derived from demodulation phasing and command unit 9. Reference to waveforms W1 and W6 shows that both inputs will be at state 1 for the duration of the demodulation command pulse for the third demodulation quadrant. During that brief time the sample and hold device 16 is connected to the integrator 15. The control pulse for the sample and hold device 16 is shown at W13.

When the demodulation command pulse for the four demodulation quadrant rises, the pulse in waveform W7 rises and becomes available at 28D to control sample and hold device 19 through the AND gate 29C2 which functions in the same manner as AND gate 29C1. The control pulse for the sample and hold device 19 is shown at W14.

When the synchronization pulse for the second demodulation cycle occurs, immediately followed by the command pulse for the first quadrant of said second cycle, an AND gate 29D, responding to the coincidence between the pulse on line 28A and the demodulation command pulse from unit 9, will cause the sample and hold device 21A to sample the content of unit 17 and hold it. The control pulse for sample and hold device 21A is shown at W15.

When the demodulation command pulse for the second demodulation quadrant in said second cycle follows, AND gate 29E, responding to the pulse coincidence between the output of unit 9 and the pulse on line 28B, causes both sample and hold devices 24 and 21B to make their signal information content simultaneously available across resistor 22 and wire 25A, respectively, the recorder 26 then performing the ratioing function as described earlier. The control pulse for sample and hold devices 21B and 24 is shown at W16.

A time constant in the signal chain between the detector and the demodulating means should be chosen so that a linear change in the ratio between the sample signal integral and the reference signal integral occurs for a linear change in the generation frequency over the range of frequency fluctuation that must be covered. The choice is best made empirically, such as by altering the time constant of one or more AC couplings in said chain.

FIG. 15 shows the details of the demodulation phasing and command unit 9 (FIG. 11) incorporating the demodulation cycle synchronization means 27 (FIG. 11) and including co-operating beam switching means suitable for the spectrophotometric application to which the embodiment described with reference to FIGS. 8 to 14 relates.

In FIG. 15, the beam switching means comprise a first rotary sector mirror 30 having a straight-through-air quadrant 30A, a reflective quadrant 30B and two successive opaque and non-reflecting quadrants jointly referenced 30C. The sector mirror 30 is driven by a synchronous motor (not shown) fed from the AC power source. Its rotary motion is transmitted to another sector mirror 32, through gearbox 31 providing a speed step up ratio of 1 to 2. Note that the sector mirrors and the gearbox are shown in purely symbolical form and that no bearings or supports are indicated.

Sector mirror 32 comprises two successive straight-through-air quadrants jointly referenced 32A and two successive reflecting quadrants jointly referenced 32B. The operation of the two sector mirrors in co-operation with a spectrophotometric detector in providing the detector output waveform shown in FIG. 2 is described in U.S. Pat. No. 3,542,480.

Integral in rotation with the sector mirror 30 is an aluminium disc 9A provided with edge slots such as 9A1 and a single aperture 9A2 under one of the slots (identified later).

An assembly 9B rotatable within limits around the axis of rotation of the disc 9A is provided with a slotted extension 9B1 which by means of screw 9B2 enables the assembly to be secured against rotation to frame part 33, after its angular position has been adjusted to ensure that the photosensor 9B3 "sees" the lamp 9B4 through the slots such as 9A1 with the required time advance relative to the occurrence of the associated optical edges. The aperture 9A2 occurs slightly ahead of the slot 9A1 (note direction of rotation indicated by arrow AW) that corresponds to the start of the first demodulation quadrant (yielding, as we know, the information S + s + RL) and the photosensor 27A is arranged to "see" the lamp 27B slightly before the photosensor 9B3 "sees" the lamp 9B4. The two photosensors and the two lamps form part of the assembly 9B and are fixed in position.

It is clear from the above that the demodulation control and phasing function is performed by the co-operation of the photosensor 9B3, lamp 9B4 and disc 9A and the demodulation-cycle synchronization function is performed by the co-operation between photosensor 27A, lamp 27B and disc 9A. The output of photosensor 9B3 represents the input to unit 10 in FIG. 11 and the output of photosensor 27A the input to unit 28. Unit 9 and means 27 have been kept separate in FIG. 11 for a clearer appreciation of their distinct functions.

The demodulation phasing adjustment provided by the rotatable assembly 9B enables the cross-talk between the sample and the reference demodulation channels to be substantially balanced out, any balance achieved being safeguarded against the effect of generation frequency variations by introducing a constant time delay between demodulation command and demodulation execution, in accordance with the present invention. The simplicity and effectiveness of this solution should be contrasted with the cumbersome and expensive substitution of the public AC power supply with an independent frequency-nebulized supply driving the beam switching devices, as found in some prior art apparatus.

The foregoing description has been made with reference to the drawings which depict one embodiment of the invention. Those skilled in the art will recognize that the circuits shown have been provided for clarity and is not intended to be a limitation of the invention whose spirit and scope is defined by the claims.

What is claimed is:

1. In an apparatus comprising signal generating means for producing at a given generation frequency subject to spurious fluctuations an electrical signal having a component varying in response to a first quantity and a component varying in response to a second quantity, the signal transfer characteristic of said generating means being such as to cause cross-talk between the two components, the combination of:
 (a) demodulation means referenced to said signal generating means for switching each component into its own demodulation channel;
 (b) phasing means forming part of said demodulation means for adjusting the timing of the demodulation switching referred to said generation frequency so as to separate the two components while substantially establishing cross-talk balance in each of the two demodulation channels; and
 (c) means co-operating with said demodulation means to retard or advance the timing of demodulation switching in the presence of a spurious increase or a decrease, respectively, of the generation frequency, the amount of retard or advance being related to the amplitude of the frequency change, whereby cross-talk balance as set at a datum generation frequency is substantially maintained despite the presence of said fluctuations.

2. Apparatus as claimed in claim 1, wherein the phasing means are associated with demodulation command means for producing before the rise of a signal component a demodulation command correlated to said timing and the demodulating means include demodulation execution means for switching said signal component into its allotted demodulation channel after the said rise.

3. Apparatus as claimed in claim 2, wherein said means co-operating with said demodulating means comprise a time delay setting means operationally related to both the demodulation command means and the demodulation execution means for delaying the operation of the demodulation execution means by a predetermined interval from the occurrence of said demodulation command.

4. Apparatus as claimed in claim 3, wherein the time delay setting means is a monostable device having means for predetermining the switch over time.

5. Apparatus as claimed in claim 3, wherein the demodulation execution means includes means for alternately switching one and other component each into its allotted demodulation channel, each demodulation channel comprising means for integrating the associated demodulation signal component, the two demodulating channels being electrically coupled to ratioing means for obtaining the ratio of the two integrated demodulated signal components, a time constant defining means electrically ahead of the demodulating means providing a time constant such that a substantially linear change occurs in the ratio between the two signals as produced by the ratio means for a linear change in the generation frequency over the range of frequency fluctuations of interest.

6. In a ratio-recording spectrophotometer comprising a source of photometric radiation, a detector of said radiation, and optical sample channel and an optical referecne channel, beam switching means driven by an electric motor phased to the frequency of an AC supply subject to spurious frequency fluctuations for switching to the said detector the photometric beam alternately from one and other optical channel so as to give rise to a detector output having two consecutive components representing sample beam intensity and reference beam intensity, respectively, the detector output thus occurring at a generation frequency related to the AC supply frequency, demodulating means for separating the two signal components in a sample demodulation channel and a reference demodulation channel, said demodulating means comprising phasing means for adjusting the timing of the demodulation switching relative to said frequency so as to demodulate the two signal components while substantially establishing cross-talk balance in each of the two demodulation components, and means for rationing the output of one demodulation channel with that of the other demodulation channel, the combination of:
  (a) demodulation command means associated with said phasing means for producing before the rise of a signal component a demodulation command correlated to said timing;
  (b) demodulation execution means forming part of said demodulation means for switching said signal component into its allotted demodulation channel after said rise; and
  (c) means co-operating with the demodulation command means to retard or advance the timing of the demodulation switching in the presence of a spurious increase or decrease, respectively, of the generation frequency, the amount of retard or advance being related to the amplitude of the frequency change, whereby cross-talk balance has set at a datum generation frequency is substantially maintained despite the presence of said frequency fluctuations.

7. A ratio-recording spectrophotometer as claimed in claim 6, (comprising) wherein the means co-operating with said demodulation means comprises a time delay setting means operationally related to both the demodulation command means and the demodulation execution means for delaying the operation of the demodulation execution means by a predetermined time interval from the occurrence of said demodulation command.

8. A ratio-recording spectrophotometer as claimed in claim 7, wherein the demodulation execution means comprise means for alternately switching the sample signal component and the reference signal component each into its allotted demodulation channel and wherein the beam switching means is adapted to present to the detector in the four equal consecutive optical quadrants the sample channel radiation plus sample channel re-radiation $(S+s)$, next the reference channel radiation plus reference channel re-radiation $(R+(e)r)$, followed by sample channel re-radiation $(s)$ and finally reference channel re-radiation $(r)$ and the demodulating means comprise means for subtracting the detector signal arising in the third demodulation quadrant from that arising in the first demodulation quadrant so as to obtain a sample demodulation channel output that is substantially free from re-radiation effect and means for subtracting the detector signal arising in the fourth demodulation quadrant from that arising in the second demodulation quadrant so as to obtain a reference demodulation channel output that is substantially free form re-rediation effect.

9. A ratio-recording spectrophotometer is claimed in claim 8, wherein the demodulation execution means provide discrimination between two states one state of which admits into the sample demodulation channel the detector signal arising in the first and third demodulation quadrant and the other state admits into the reference demodulation channel the detector signal arising in the second and fourth demodulation quadrants and a logic switching unit time referenced to the demodulation execution means controls the operation of the two demodulation channels for effecting signal subtraction in each demodulation channel through the associated subtracting means.

10. A ratio-recording spectrophotometer is claimed in claim 9, wherein the sample demodulation channel comprises:
  (a) a sample signal integrator for integrating during the first demodulation quadrant a sample signal representing sample radiation plus sample re-radiation plus reference leakage $(S + s + RL)$ and for integrating during the third demodulation quadrant a signal representing sample re-radiation plus reference leakage $(s + RL)$; and
  (b) first sample and hold means for sampling the $(S + s + RL)$ signal and holding it, the sample demodulation channel subtracting means being controlled to subtract in the third demodulation quadrant the said $(s + RL)$ signal from the stored $(S + s + RL)$ signal; and wherein the reference demodulation channel comprises:

(c) a reference signal integrator for integrating during the second demodulation quadrant a reference signal representing reference radiation plus reference re-radiation plus sample leakage (R + r + SL) and for integrating during the fourth demodulation quadrant a signal representing reference re-radiation plus sample leakage (r + SL); and (d) second sample and hold means for sampling the (R + r + SL) signal and holding it;

(e) the reference demodulation channel subtracting means being controlled to subtract in the fourth demodulation quadrant the (r + SL) signal from the (R + r + SL) signal.

11. A ratio-recording spectrophotometer as claimed in claim 10, wherein the logic switching means are adapted to enable the resetting of each of the two integrators during the time delay interval preceding the active demodulation quadrant of the integrator, the said integrator being adapted to hold its output level accrued during an active demodulation quadrant for at least the portion of the next following inactive demodulation quadrant that is sufficient to sample the said output level.

12. A ratio-recording spectrophotometer as claimed in claim 11, wherein the logic switching means are adapted to enable the sample and hold means of the sample demodulation channel to sample and hold the content of the sample signal integrator not later than the occurrence of the demodulation command for the third demodulation quadrant and to enable the sample and hold means of the reference demodulation channel to sample and hold the content of the reference signal integrator not later than the occurrence of the demodulation command for the fourth demodulation quadrant.

13. A ratio-recording spectrophotometer as claimed in claim 12, wherein additional sample and hold means under the control of the logic switching means cooperate with each subtracting means to extend the output of one subtracting means to the ratioing means simultaneously with the output of the other subtracting means.

14. A ratio-recording spectrophotometer as claimed in claim 13, wherein the additional sample and hold means and the manner of their control by the logic switching means ensure that two subtracting means outputs evaluated in one demodulation cycle are made available to the ratioing means before the occurrence of the demodulation command for the second demodulation quadrant of the next following demodulation cycle.

15. A ratio-recording spectrophotometer as claimed in claim 6, wherein signal processing means are provided between the detector output and the demodulating means input, said signal processing means including at least one time constant defining means providing a time constant value suitable to ensure that a substantially linear change in the ratio between the sample signal integral and the reference signal integral occurs for a substantially linear change in the signal generation frequency over the range of the frequency fluctuations in said AC supply that is of interest.

16. A ratio-recording spectrophotometer as claimed in claim 7, wherein the time delay setting means is a monostable device having means for predetermining the switch over time.

* * * * *

UNITED STATES PATENT AND TRADEMARK OFFICE
CERTIFICATE OF CORRECTION

PATENT NO. : 4,132,481

DATED : Jan. 2, 1979

INVENTOR(S) : Michael Ford and David Jackson

It is certified that error appears in the above-identified patent and that said Letters Patent are hereby corrected as shown below:

Column 1, line 28, "dector" should be --detector-- line 29, delete "detector" and insert --to--

Column 3, line 28, after described insert --by--

Column 9, line 25, looking should be --locking-- line 31, after detector insert --signals--

Column 10, line 52, after in delete "FIG."

line 62, delete "mains" and insert --source--

Column 13, line 62, after going insert --)-- and delete "("

before and

Column 17, line 37, change referecne to --reference--

Column 18, line 37, change form to --from--

UNITED STATES PATENT AND TRADEMARK OFFICE
CERTIFICATE OF CORRECTION

PATENT NO. : 4,132,481
DATED : January 2, 1979
INVENTOR(S) : Michael Ford et al.

It is certified that error appears in the above—identified patent and that said Letters Patent is hereby corrected as shown below:

Column 18, line 38, change rediation to -- radiation --.

*Signed and Sealed this*

*Twenty-ninth* Day of *April 1980*

[SEAL]

*Attest:*

SIDNEY A. DIAMOND

*Attesting Officer*   *Commissioner of Patents and Trademarks*